United States Patent [19]
Olafson

[11] Patent Number: 5,788,844
[45] Date of Patent: Aug. 4, 1998

[54] PROCESS FOR REMOVING AND RECOVERING AMMONIA FROM ORGANIC METAL EXTRACTANT SOLUTIONS IN A LIQUID-LIQUID METAL EXTRACTION PROCESS

[75] Inventor: Stephen M. Olafson, Tucson, Ariz.

[73] Assignee: Henkel Corporation, Plymouth Meeting, Pa.

[21] Appl. No.: 486,444

[22] Filed: Jun. 8, 1995

[51] Int. Cl.$^6$ ............................................. B01D 11/02
[52] U.S. Cl. ................ 210/634; 210/805; 210/806; 210/903; 423/24; 423/32
[58] Field of Search .................. 210/634, 511, 210/639, 805, 806, 903; 423/24, 32

[56] References Cited

U.S. PATENT DOCUMENTS

| | | |
|---|---|---|
| 2,727,818 | 12/1955 | Kenny et al. . |
| 3,853,981 | 12/1974 | Hadzeriga et al. .......... 423/24 |
| 3,929,598 | 12/1975 | Stern et al. . |
| 3,950,487 | 4/1976 | Pemsler et al. ............ 423/24 |
| 4,005,173 | 1/1977 | Pemsler et al. ............ 423/24 |
| 4,015,980 | 4/1977 | Mackay et al. . |
| 4,022,866 | 5/1977 | Kuhn et al. ............... 423/26 |
| 4,036,629 | 7/1977 | Strong . |
| 4,065,502 | 12/1977 | MacKay et al. . |
| 4,175,012 | 11/1979 | MacKay et al. . |
| 4,258,016 | 3/1981 | Siemens et al. ............ 423/24 |
| 4,544,532 | 10/1985 | Kordosky et al. .......... 423/24 |
| 4,563,256 | 1/1986 | Sudderth et al. . |
| 5,158,603 | 10/1992 | Stierman et al. ........... 423/24 |
| 5,174,812 | 12/1992 | Price et al. ................. 75/628 |
| 5,176,802 | 1/1993 | Duyvesteyn et al. . |
| 5,196,095 | 3/1993 | Sudderth et al. ........... 423/24 |
| 5,260,039 | 11/1993 | Schwab et al. ............ 423/24 |

FOREIGN PATENT DOCUMENTS 294868  8/1928  United Kingdom .

OTHER PUBLICATIONS

Kuhn and Arbiter, "Physical and Chemical Separations via the Arbiter Process", 11th International Mining Congress, Apr., 1975, Cagliari, Italy; Proc–Int. Miner. Process Congress., Paper 30, pp. 831–847.

Kuhn and Arbiter, "Anaconda's Arbiter Process for Copper", Hydrometallurgy, CIM Bulletin, Feb. 1974, pp. 62–73.

Filmer, Anthony O., "Oxidation of Copper Sulfides in Aqueous Ammonia" part III, Kinetic Characteristics, Austr. J. Chem. 1979, 32, pp. 2597–2609.

*Primary Examiner*—Joseph W. Drodge
*Attorney, Agent, or Firm*—Ernest J. Szoke; Wayne C. Jaeschke; Patrick J. Span

[57] ABSTRACT

A process for removing and recovering ammonia from the organic extraction phase in a metal liquid-liquid extraction process in which at least one ammoniacal aqueous solution (either a leach feed solution containing the metal to be extracted or an aqueous stripping solution employed to strip the metal values from the organic phase) is contacted with the organic phase which comprises a water insoluble, water immiscible hydrocarbon solvent solution of a water insoluble organic extractant for the metal.

29 Claims, 2 Drawing Sheets

PROCESS FOR REMOVING AND RECOVERING AMMONIA FROM ORGANIC METAL EXTRACTANT SOLUTIONS IN A LIQUID-LIQUID METAL EXTRACTION PROCESS

BACKGROUND OF THE INVENTION

1. Field of the Invention

This invention relates to the liquid-liquid metal extraction process in which an aqueous solution containing the metals to be extracted is contacted with an organic phase comprised of a water insoluble organic extractant for the metal in a water insoluble, water immiscible hydrocarbon solvent. More particularly, the invention relates to such processes in which aqueous ammoniacal solutions are employed either as the aqueous feed solution containing the metal values or as an aqueous stripping solution employed to remove or strip the metal values from the organic phase after extraction from the aqueous feed solution. Still more particularly, the invention relates to the removal and recovery of the ammonia which transfers to the organic phase due to contact with an aqueous ammoniacal solution in the process.

2. Statement of Related Art

Liquid-liquid extraction processes employing water insoluble, water immiscible organic hydrocarbon solutions of metal extractants to extract metal values from aqueous solutions containing the metal values are well known. These processes generally may be described as a process for recovering metal values from aqueous solutions containing the metal values by contacting the aqueous solution with the water insoluble, water immiscible organic phase for a time sufficient to extract at least a portion of the metal values in the aqueous phase. Because of the immiscibility of the aqueous solution and the organic phase (organic extractant hydrocarbon solution), the two phases separate and may separately be removed for processing. The organic phase, now containing metal values, is typically then contacted with an aqueous stripping solution to remove the metal values from the organic phase and the metal values are then recovered from the stripping solution by conventional procedures such as electrorowinning, precipitation or otherwise.

In these processes, the aqueous feed solutions result from the leaching of metal containing ores or other metal containing sources with either acidic or basic leaching solutions. Thus the feed solution may be an acidic solution or basic solution. Typically the basic leaching solution will be an ammoniacal solution. The stripping solutions typically are also either acidic or basic aqueous solutions dependent on the particular metal, extractant employed and condition of the processing. With certain metals, aqueous ammoniacal solutions may be employed both as the feed and stripping solutions or as the stripping solution even though the feed solution from which the metals are extracted is an acidic feed solution.

Accordingly, ammoniacal leaching of materials to provide ammoniacal solutions containing metal values is well known and recognized by those skilled in the art. Where copper is present along with the zinc, both copper and zinc dissolve quite readily in aqueous ammoniacal solutions and in the past difficulty has been encountered in producing separate substantially pure copper and zinc products from a leach solution. A discussion of this area can be found in U.S. Pat. No. 3,929,598 which discussion is incorporated herein by reference. In U.S. Pat. No. 4,563,256, also incorporated herein by reference, there is described a process for recovery of zinc values from aqueous ammoniacal solutions employing certain alkylsalicylaldoximes or acetophenoximes as the extractant. The method described therein also provides a means for separation of the zinc and copper values present in the aqueous ammoniacal solution. In this process the zinc and copper values are separately recovered from the organic phase by pH controlled stripping; however, by differing acid pH levels. In the process of extraction, the organic phase contains the extracted zinc and some ammonia. In this patent the zinc loaded organic phase is sent to a pH washing stage where it is contacted with dilute acid to selectively remove the ammonia from the organic phase. The ammonia free or washed organic is then sent to the stripping portion of the overall circuit. In this process the ammonia found in the organic phase results from contact with the ammoniacal feed solution and is removed by a dilute wash.

U.S. Pat. No. 3,853,981 also discusses ammoniacal feed solutions. In this patent the aqueous ammoniacal solution is first treated with an extractant selective for the copper. The extractants are certain benzophenoxime types. Three stages of extraction are suggested and the pregnant organic containing the copper is then sent to a sulfuric acid strip from which the aqueous copper solution is used in an electrolyzing step with the barren organic being recycled to the extraction stage. The aqueous raffinate from the extraction stage is sent to a recovery circuit for the second metal which is disclosed as either an extraction with di-2-ethylhexylphosphoric acid (DEHPA), or by precipitation by the addition of carbon dioxide or by boiling off ammonia, procedures all well known to the art. In this patent an aqueous highly acid strip solution, i.e., concentrated sulfuric acid is employed.

In another patent, U.S. Pat. No. 4,022,866 to Kuhn and Arbiter and in their subsequent paper, "Physical and Chemical Separations via the Arbiter Process" 11th International Mining Congress, April, 1975, Cagliari, Italy; Proc.-Int. Miner. Process Congress., Paper 30: pp 831–847; there is described the leaching of copper sulfide concentrates with ammonia/ammonium sulfate and oxygen whereby the sulfide is converted to sulfate, and the dissolved copper may then be recovered by solvent extraction. In the patent complete leaching of the copper from the ore is preferred although FIG. 3 also describes an embodiment in which a partial leaching is contemplated. The solvent extraction reagents are described in the patent only generally as those which preferentially load copper from alkaline solutions. In the paper, which describes the operation of the Arbiter process, the focus is on complete (or nearly complete) leaching of the sulfide concentrates. On page 834 a chalcocite concentrate is specifically discussed and diagrammed, with all the copper and associated sulfur being dissolved.

In another Kuhn and Arbiter paper, "Anaconda's Arbiter Process for Copper", Hydrometallurgy, CIM Bulletin, Feb.1974, pp 62–73, makes reference to "complete dissolution of copper" and on page 65, refers to the known conversion of chalcocite to covellite, but points out that the chalcocite and covellite "are observed to be completely attacked and dissolved in our leaching system within 1 to 1½ hours".

A paper by Anthony O. Filmer et al, "Oxidation of Copper Sulfides in Aqueous Ammonia" part III, "Kinetic Characteristics", Austr. J. Chem. 1979, 32, pp. 2597–2609, gives a detailed study of the ammoniacal oxidation of chalcocite, first to covellite, then to complete dissolution.

U.S. Pat. No. 2,727,818 describes a method of leaching copper sulfide materials with ammoniacal leach solutions,

3 indicating that the first Cu from $Cu_2S$ (chalcocite) dissolves without dissolution of sulfur, and the Cu from CuS (covellite) dissolves only when its sulfur also dissolves. No solvent extraction is discussed.

U.S. Pat. Nos. 4,065,502 and 4,175,012 describes beta-diketones which may be employed as metal extractants in a liquid ion exchange process for recovery of metals, such as nickel or copper, from aqueous solutions containing the metal values, including aqueous ammoniacal solutions.

In commonly assigned U.S. application Ser. No. 07/745, 028 now abandoned, a partial leaching of chalcocite with ammoniacal aqueous solutions is disclosed with the use of a high copper transfer, low ammonia loading beta-diketone extraction reagent which provides a very efficient process for recovery of copper. While the beta-diketones are preferred because of their lower ammonia loading properties, other copper loading extractants may be employed such as the oxime extractants although in this instance higher ammonia loading into the organic extractant phase may result, and the ammonia needs to be removed and recovered from the organic phase before the organic phase is recycled back for extraction.

Other patents in this same area of extraction of copper from chalcocite and covellite are U.S. Pat. Nos. 4,036,629 and 5,176,802 to Duyvesteyn.

In another commonly assigned U.S. application Ser. No. 07/266,535, the entire disclosure of which is hereby incorporated by reference, there is described a nickel extraction process in which nickel is extracted from aqueous ammoniacal feed solutions and in which a concentrated ammonia stripping solution is also employed. The extractants employed are hydroxyaryl oximes. The organic phase comprised of oxime extractant dissolved in the organic hydrocarbon solvent may also contain kinetic additives or equilibrium modifiers. In this application, the aqueous ammoniacal feed solution contains less than 100 grams per liter (g/l) $NH_3$, and more desirably less than 70 g/l. The concentrated ammonia stripping solution preferably is a concentrated solution of aqueous ammonia saturated with carbon dioxide. Generally the aqueous solution is one having greater than 100 g/l $NH_3$, preferably greater than 180 g/l $NH_3$, and 50 g/l $CO_2$ In U.S. Pat. No. 5,174,812 there is also described a separation and recovery of nickel and cobalt in an ammoniacal system in which nickel is extracted from an ammoniacal solution with an organic phase, which may also contain a modifier, to form a nickel loaded organic phase and a cobalt containing ammoniacal ammonium carbonate phase after which the nickel loaded organic phase is contacted with a more concentrated ammoniacal ammonium carbonate solution to form a nickel loaded aqueous strip solution.

DESCRIPTION OF THE INVENTION

In this description, except in the operating examples, or where explicitly otherwise indicated, all numbers describing amounts of ingredients or reaction conditions are to be understood as modified by the word "about".

Figure 1:
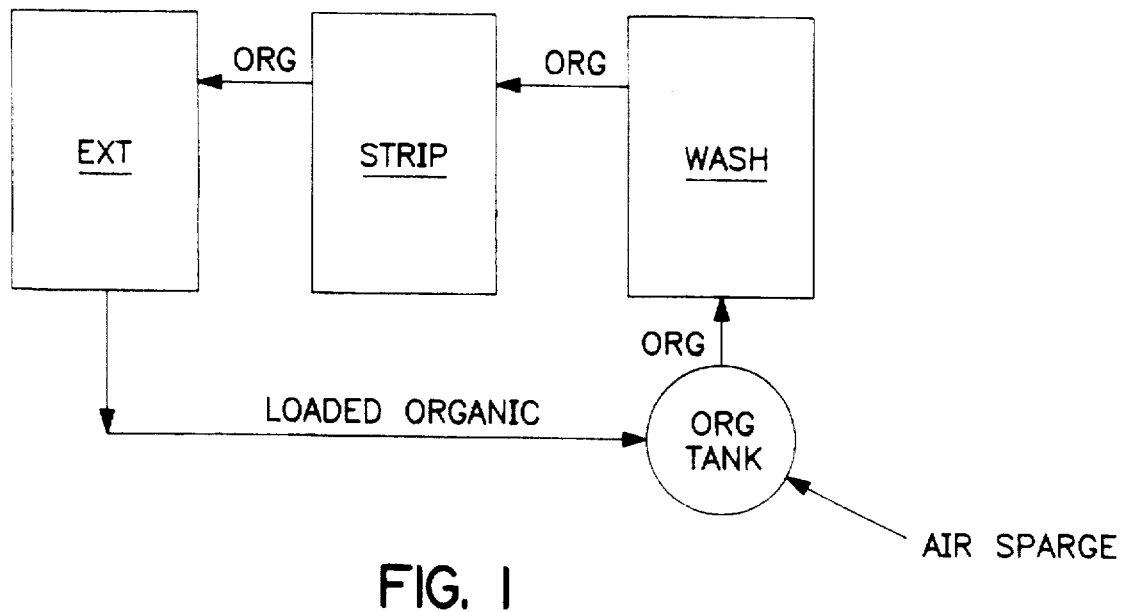
FIG. 1 is a diagrammatic flow chart illustrating the present invention where removal and recovery of ammonia from a loaded organic extractant in a water immiscible aliphatic or aromatic hydrocarbon solvent by sparging applied to the loaded organic solution before it enters a wash stage.
Figure 2:
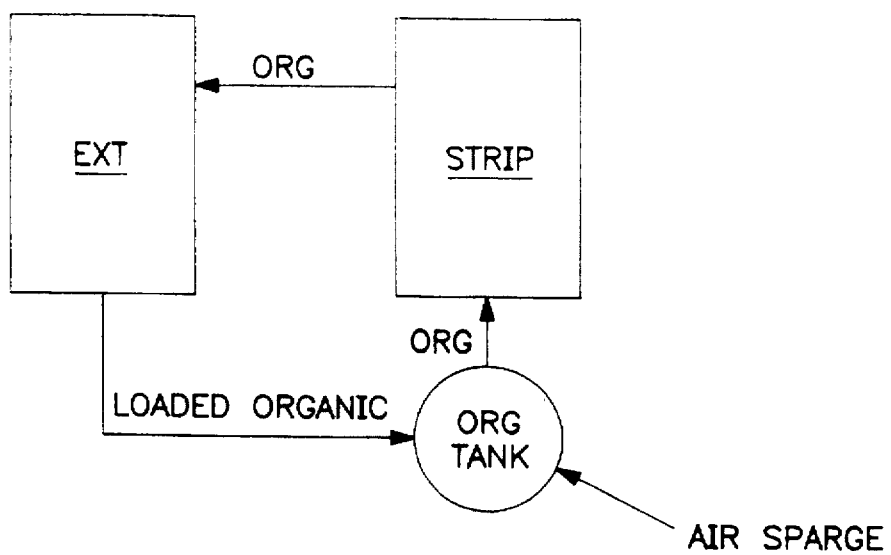
FIG. 2 is a diagrammatic flow chart in which the loaded organic phase is sparged without any wash stages.
Figure 3:
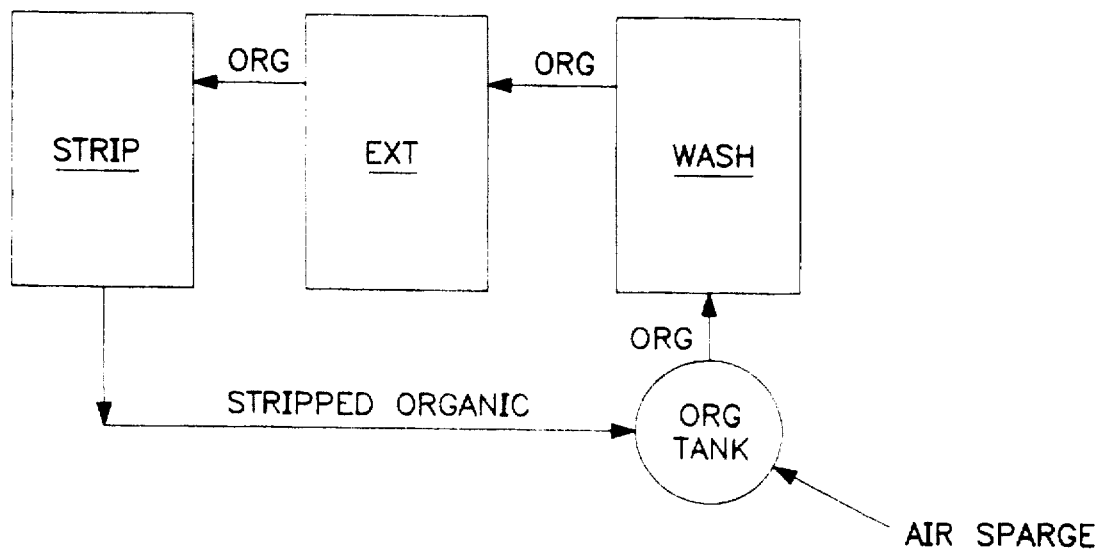
FIG. 3 is a diagrammatic flow chart in which the stripped organic phase after stripping with an aqueous ammonia solution is sparged before it enters a wash stage.
Figure 4:
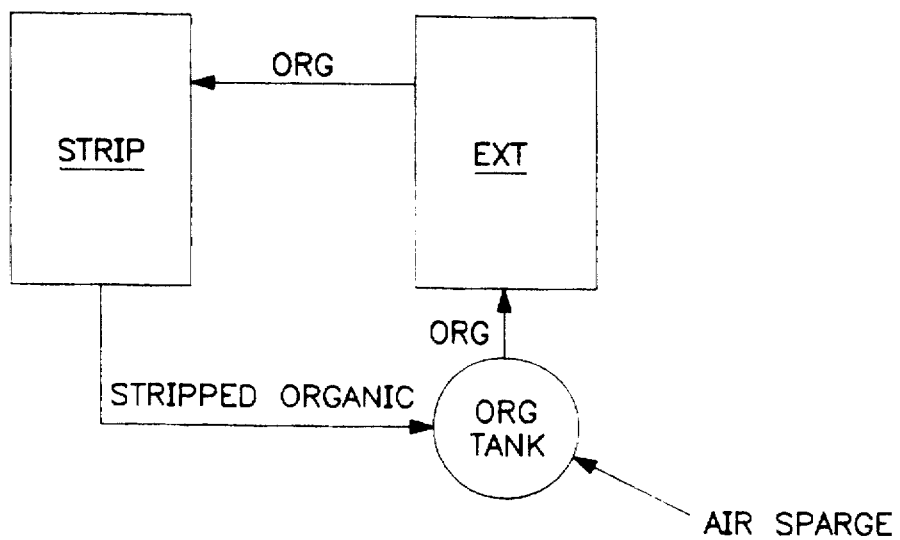
FIG. 4 is a diagrammatic flow chart in which the stripped organic phase, after stripping with an aqueous ammonia solution, is sparged before it enters an extraction stage.

It has now been discovered that when the organic phase employed in the extraction of metals in a process in which an ammoniacal aqueous solution is employed, either as a feed solution containing the metal values from which the metal values are extracted, or as an aqueous ammoniacal stripping solution from which the metal values are stripped from the organic phase after having been extracted by the organic phase from an aqueous feed solution, contains ammonia in the organic phase either from the ammoniacal feed or stripping solution, the ammonia present in the organic phase, comprised of a water insoluble metal extractant in a water immiscible organic hydrocarbon solvent, can be simply and efficiently removed and recovered from the organic phase by sparging the organic phase with an inert gas. In a case where a washing stage is employed, such as in FIGS. 1 and 3, the loaded organic phase, or the stripped organic phase, containing ammonia, the organic phase is sparged before it enters a wash stage. In the case where no wash stage is employed, as in FIGS. 2 and 4, and an ammoniacal strip solution is employed to strip the metal values from the organic phase after extraction of the metal values from the aqueous feed solution, the loaded organic phase, and the stripped organic phase, is sparged before it enters an extraction stage.

In its broadest aspect, the present invention is concerned with the removal and recovery of ammonia from a water immiscible organic phase comprised of a water insoluble metal extractant in a water immiscible, water insoluble organic aliphatic or aromatic hydrocarbon solvent by sparging the organic phase with an inert gas, preferably air, at a rate in which the ammonia present in the organic phase is sparged from the organic phase. As used herein by sparging is meant the usual customary definition as the agitation of a liquid by means of an air or gas entering the liquid, preferably by means of a pipe or other conduit thereby flowing or bubbling through the liquid. The bubbling of a gas so as to make intimate contact with the organic phase and the ammonia therein, thereby removing the ammonia from the organic phase. Thus the organic phase may be contacted with a gas by stirring in a manner which introduces bubbles of the gas into the organic phase, by means of compressed air or gas through a pipe, or by passing the organic phase through a tube having an opening therein, at a sufficient flow rate to aspirate the air or gas into the organic phase. The process is typically carried out at ambient temperature, but the use of higher temperatures, which may in some cases prove to be beneficial, is also contemplated.

The water insoluble metal extractant dissolved in the water immiscible, water insoluble organic solvent may be any metal extractant capable of extracting the metal values from an aqueous ammoniacal solution containing the particular metal values, or capable of stripping of the metal values from the organic phase by an aqueous ammoniacal strip solution. The invention is particularly suitable for use in extraction processes of metals which are leached by ammoniacal aqueous solution or being stripped from an organic phase after extraction of the metal values from any aqueous solution containing the metal values by aqueous ammoniacal stripping solutions. The invention thus particularly finds utility in relation to metal values such as copper, zinc, cobalt and nickel which are commonly found contained in aqueous ammoniacal solutions as discussed earlier herein. However, it is understood that the invention is applicable to any metal in which the metal values will be found in an aqueous ammoniacal solution within a feed solution from which the metal values are to be extracted or in an aqueous ammoniacal stripping solution which strips the metal values from the organic phase after extraction. Such other metals may include molybdenum.

The water insoluble metal extractants are any water insoluble organic compounds capable of extracting metal values from aqueous solutions, whether acid or ammoniacal solutions and include the well known and recognized extractant for metals such as copper, zinc, and nickel such as beta-diketones, oximes, or amines, containing a sufficient number of carbon atoms to be water insoluble but soluble in water immiscible, water insoluble aliphatic or aromatic hydrocarbon solvents.

The preferred beta-diketone extractants, particularly useful for extraction of metals such as copper, zinc, or nickel may be more specifically defined as having the formula:

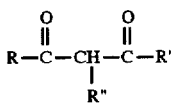

Where R is phenyl or alkyl substituted phenyl, R' is alkyl, alkyl substituted phenyl or chloro substituted phenyl and R" is H or CN with the provisos that (1) when R is phenyl, R' is a branched chain alkyl group of at least seven carbon atoms and (2) when R is alkyl substituted phenyl, the number of carbon atoms in the alkyl substituent is at least 7 and at least one such alkyl substituent is a branched chain. R is desirably monoalkyl substituted and preferably contains 9 or more carbon atoms. The various alkyl groups are preferably free from substitution and contain less than 20 carbon atoms. Accordingly, the alkyl groups will contain at least 7, preferably 9 or more carbon atoms, up to about 20 carbon atoms. Further when R' is alkyl, the carbon alpha to the carbonyl group is desirably not tertiary. Preferably, R" is H,R' is a branched 7, 8, 9, 12, or 17 carbon chain or a chlorophenyl or short chain (1–5 carbon) alkyl substituted phenyl and R is phenyl or a 7, 8, 9, or 12 carbon alkyl substituted phenyl group. A preferred beta-diketone is 1-phenyl-3-heptyl-1,3-propanedione.

While the beta-diketone compounds may be preferred for use because of their low ammonia loading properties, other water insoluble copper loading extractants capable of loading copper from aqueous ammonical solutions may be employed. With such other reagents, the sparging technique of the present invention may be of even greater utility because of potentially higher ammonia transfer, before stripping and recycling of materials in the continuous process. Other high copper loading extractants, which may be desirably employed, either alone or in admixture, are certain oximes, such as those described in U.S. Pat. No. 4,563,256. Oximes which may be employed in the present invention are those generally conforming to the formula:

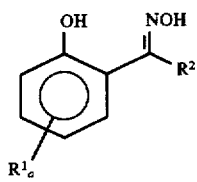

where $R^1$ is a saturated aliphatic group of 1–25 carbon atoms or an ethylenically unsaturated aliphatic group of 3–25 carbon atoms or —$OR^3$, where $R^3$ is a saturated or ethylenically unsaturated group as defined above, a is an integer of 0, 1, 2, 3 or 4 and $R^2$ is H or a saturated or ethylenically unsaturated group as defined above, with the proviso that the total number of carbon atoms in $R^1$ and $R^2$ is from 3–25, or phenyl or $R^4$ substituted phenyl where $R^4$ is a saturated or ethylenically unsaturated group as defined above which may be the same or different from $R^1$. Illustrative of some of the oxime compounds are 5-heptyl salicylaldoxime, 5-octyl salicylaldoxime, 5-nonyl salicylaldoxime, 5-dodecyl salicylaldoxime, 5-nonyl-2-hydroxyacetophenone oxime, 2-hydroxy-5-nonyl benzophenone oxime and 2-hydroxy-5-dodecyl benzophenone oxime. While it is preferred that a single extractant compound be employed, mixtures of extractants may be employed to meet particular system requirements.

A wide variety of essentially water-immiscible liquid hydrocarbon solvents can be used in the metal recovery process. These include aliphatic and aromatic hydrocarbons such as kerosenes, benzene, toluene, xylene and the like. A choice of essentially water-immiscible liquid hydrocarbon solvents, or mixtures thereof for commercial operations will depend on a number of factors, including the plant design of the solvent extraction plant (mixer-settler units, Podbielnak extractors) and the like. The preferred solvents for use in the recovery process of the present invention, are the aliphatic and aromatic hydrocarbons having flash points of 130 degrees Fahrenheit and higher, and preferably at least 150° F., and solubilities in water of less than 0.1% by weight. The solvents are essentially chemically inert. Representative commercial available solvents are Chevron ion exchange solvent (available from Standard Oil of California, having a flash point 195° F. Escaid 100 and 110 (available from Exxon-Europe having a flash point of 180° F.), Norpar 12 (available from Exxon-USA, flash point 160° F.), Conoco-C1214 (available from Conoco, flash point 160° F.), Aromatic 150 (an aromatic kerosene available from Exxon-USA, flash point 150° F.), and the other various kerosenes and petroleum fractions available from other oil companies.

In the process of the extraction, the organic solvent solutions will preferably contain from about 0.005 up to about 75% by weight of the oxime compounds, which typically will be employed at about 10–15%. In the case of the beta-diketone compound, it may be used in an amount approaching 100% solids, but typically will be employed at about 20–30% by weight. Additionally, volume ratios of the organic:aqueous (O:A) phase will vary widely since the contacting of any quantity of the diketone organic solution with the copper containing aqueous leach solution will result in extraction of the copper values into the organic phase. For commercial practicality, however, the organic:aqueous phase ratios for extraction are preferably in the range of about 50:1 to 1:50. It is desirable to maintain an effective O to A ratio of about 1:1 in the mixer by recycle of one of the streams. In the stripping step, the organic:aqueous stripping medium phase ratio will preferably be in the range of about 1:2 to 20:1. For practical purposes, the extracting and stripping are normally conducted at ambient temperatures and pressures, although higher and/or lower temperatures and/or pressures are entirely operable. While the entire process can be carried out as a batch operation, most advantageously the entire process is carried out continuously with the various solutions or streams being recycled to the various operations in the process for recovery of the metal, including the leaching, extraction and stripping steps.

In the extraction process the extractant reagent should be soluble in the organic water-immiscible solvent. In general the diketone compounds, and other extractants, described above will be soluble to such extent in the amounts described above. If necessary or desirable to promote desired properties of extraction, a solubility modifier may be employed. Such solubility modifiers, include long chain (6–30 carbon) aliphatic alcohols or esters, such as n-hexanol, n-2-ethylhexanol, isodecanol, dodecanol, tridecanol, hexadecanol, octadecanol, isohexadecanol, 2-(1, 3,3-trimethylbutyl)-5,7,7-trimethyloctanol and 2,2,4-trimethyl-1,3-pentanediol mono- or di- isobutyrate; long chain alkyl phenols, such as heptylphenol, octylphenol, nonylphenol and dodecylphenol; and organo-phosphorus compounds, such as tri-lower alkyl (4–8 carbon) phosphates, especially tributyl phosphate and tri-(2-ethylhexyl) phosphate.

As indicated earlier other extractants which may be employed are the amines either secondary or tertiary amines or the quaternized, quaternary amines. Such amine compounds also need to be soluble in the organic hydrocarbon solvent and accordingly it is required that they contain a number of carbon atoms sufficient to be capable of solution in the organic solvent and water insoluble. In general this requires either at least one alkyl group of at least 7 carbon atoms up to about 20 carbon atoms or a plurality of alkyl groups in which the total number of carbon atoms in the alkyl groups is from about 7 to about 25 carbon atoms. Secondary amines will, of course, contain two alkyl groups wherein a tertiary amine will contain three alkyl groups. The tertiary amine may be quaternized to contain the quaternary cation of the formula

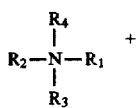

where one of the R groups may be hydrogen or alkyl and the other R groups will be groups having from 3–25 carbon atoms, with the total number of carbon atoms in the R groups is at least 14 and preferably at least 22 carbon atoms, typically up to about 24–35 carbon atoms. Generally, if one of the R groups is a lower alkyl group containing up to about 4 carbon atoms at least one of the remaining R groups will contain from about 7 up to about 20 carbon atoms. Suitable amino compounds are Alamine® 204 or 221 sold by Henkel Corporation, secondary amines in which the R groups contain 12 carbon atoms and 16–18 carbon atoms respectively, Alamine® 336 (a tertiary amine in which the alkyl groups contain mixed 8 and 10 carbon atoms. Examples of preferred tertiary amines are tri-isooctylamine, tridodecylamine and tri($C_{8-10}$ alkylamine), the latter being derived from a source of fatty alkyl groups wherein the 8 and 10 carbon alkyl groups predominate, and the quaternary compounds derived from the tertiary amines. The choice of extractants will be determined by their ability to extract the particular desired metal present in the feed solution, the solubility of the extractant and their metal complexes thereof in the organic hydrocarbon solvent and the water insolubility of the compound. Thus, the preferred secondary amines include didodecylamine and di-$C_{8-10}$ alkyl amine. Preferred tertiary amines and their quaternary counterpart include tri-octylamine, tri-dodecylamine and tri-C8–10 alkyl amine sold as tri caprylyl amines.

The invention may be illustrated by means of the following examples in which all parts and percentages are by weight unless otherwise indicated. It is understood that the purpose of the examples is entirely illustrative and is in no way intended to limit the scope of the invention.

EXAMPLE 1

An organic solution consisting of 40 V/V% 1-phenyl-3-heptyl-1,3-propanedione in Escaid 100 was loaded with copper by contacting it for 5 minutes in a baffled 1 liter glass beaker at an organic/aqueous ratio of 1/1 with an aqueous solution containing 35.0 grams per liter copper, 1.5 grams per liter zinc and 45 grams per liter total ammonia (pH 8.9). After 5 minutes of mixing, the mixer was shut off and the organic and aqueous phases were allowed to separate for 10 minutes. The aqueous solution was discarded and the loaded organic solution was divided into two aliquots of equal volume.

One aliquot of loaded organic was placed in a baffled beaker and washed at an organic/aqueous ratio of 1/1 with deionized water for five minutes. The mixer was shut off after 5 minutes, the phases were allowed to separate, the organic phase was discarded and the ammonia in the wash water was titrated using 0.10 normal sulfuric acid. The results of the titration showed this aliquot of organic contained 0.357 g/l ammonia.

The other aliquot of loaded organic was transferred to a 1 liter graduated cylinder where air was sparged through the organic solution for 10 minutes using a glass frit. After ten minutes of air sparging, the loaded organic solution was transferred to a baffled beaker and washed at an organic/aqueous ratio of 1/1 with deionized water for five minutes. The mixer was shut off after 5 minutes, the phases were allowed to separate, the organic phase was discarded and the ammonia in the wash water was titrated using 0.10 normal sulfuric acid. The results of this titration showed that the air sparging process had reduced the ammonia in this aliquot of organic to 0.021 g/l.

The results showed the air sparging process reduced the ammonia in the 1-phenyl-3-heptyl-1,3-propanedione/Escaid 100 solution from 0.357 g/l to 0.021 g/l, a reduction in ammonia of 94.1%.

EXAMPLE 2

An organic solution consisting of 30 V/V% 2-hydroxy-5-nonylacetophenone oxime in Escaid 100 was loaded with copper by contacting it for 5 minutes in a baffled 1 liter glass beaker at an organic/aqueous ratio of 2.3/1.0 with an aqueous solution containing 35.0 grams per liter copper, 1.5 grams per liter zinc and 45 grams per liter total ammonia (pH 8.9). After 5 minutes of mixing, the mixer was shut off and the organic and aqueous phases were allowed to separate for 10 minutes. The aqueous solution was discarded and the loaded organic solution was divided into two aliquots of equal volume.

One aliquot of loaded organic was placed in a baffled beaker and washed at an organic/aqueous ratio of 1/1 with deionized water for five minutes. The mixer was shut off after 5 minutes, the phases were allowed to separate, the organic phase was discarded and the ammonia in the wash water was titrated using 0.10 normal sulfuric acid. The results of the titration showed this aliquot of organic contained 0.2125 g/l ammonia.

The other aliquot of loaded organic was transferred to a 1 liter graduated cylinder where air was sparged through the organic solution for 10 minutes using a glass frit. After ten minutes of air sparging, the loaded organic solution was transferred to a baffled beaker and washed at an organic/aqueous ratio of 1/1 with deionized water for five minutes. The mixer was shut off after 5 minutes, the phases were allowed to separate, the organic phase was discarded and the ammonia in the wash water was titrated using 0.10 normal sulfuric acid. The result of the titration showed the ammonia in this aliquot of organic had been reduced to a non-detectable level.

The results showed the air sparging process reduced the ammonia in the 2-hydroxy-5-nonylacetophenone oxime/Escaid 100 solution from 0.2125 g/l to a non-detectable level. The results of Examples 1 and 2 are shown in the following Table I:

TABLE I

| SAMPLE | 1-phenyl-3-heptyl-1,3-propanedione | 2-hydroxy-5-nonylacetophenone oxime |
|---|---|---|
| Pre Air Sparge | 0.357 g/l NH$_3$ | 0.2125 g/l NH$_3$ |
| Post Air Sparge | 0.021 g/l NH$_3$ | No NH$_3$ Detected |

It is claimed:

1. A process of removing and recovering ammonia from an organic phase comprising a water-insoluble metal extractant dissolved in a water immiscible aliphatic or aromatic hydrocarbon solvent and containing ammonia and metal values extracted from an aqueous solution containing said metal values, said process comprising:

(a) stripping the organic phase with a solution to strip metal values therefrom and then sparging an inert gas through the organic phase thereby removing the ammonia present in the organic phase, and (b) recovering the ammonia sparged from the organic phase.

2. A process as defined in claim 1 in which the metal is one capable of dissolution in an ammoniacal aqueous solution.

3. A process as defined in claim 1 in which said aqueous ammoniacal solution is an ammoniacal leach solution resulting from the leaching of the metal containing ore.

4. A process as defined in claim 1 in which said aqueous ammoniacal solution is an aqueous ammoniacal stripping solution employed to strip metal values from the organic phase after extraction of the metal values from an aqueous leach solution containing the metal values by the water-insoluble metal extractant in the organic phase.

5. A process as defined in claim 1, wherein the metal is selected from the group consisting of copper, zinc, cobalt, molybdenum and nickel.

6. A process as defined in claim 5 wherein the water-insoluble extractant is one capable of extracting the metal from an aqueous solution containing the metal values and is selected from the group consisting of:

(a) a diketone;

(b) an aryl hydroxy oxime;

(c) an amine and mixtures thereof.

7. A process as defined in claim 6 wherein the extractant comprises a diketone having the formula

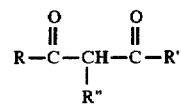

where R is phenyl or alkyl substituted phenyl,R' is alkyl, alkylsubstituted phenyl or chloro substituted phenyl and R" is H or CN with the provisos that (1) when R is phenyl, R" is a branched chain alkyl group of at least seven up to 20 carbon atoms;

(2) when R is alkyl substituted phenyl the number of carbon atoms in the alkyl substituent is at least 7 up to 20 carbon atoms; and (3) when R' is alkyl the carbon alpha to the carbonyl group is not tertiary.

8. A process as defined in claim 7 in which the beta diketone is 1-phenyl-3-heptyl-1,3-propanedione.

9. A process as defined in claim 6 wherein the extractant comprises an hydroxy aryl oxime having the formula

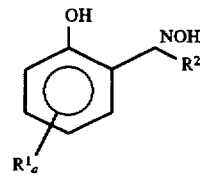

where $R^1$ is a saturated aliphatic group of 1–25 carbon atoms or an ethylenically unsaturated aliphatic group of 3–25 carbon atoms or $OR^3$, where $R^3$ is (a) a saturated or ethylenically unsaturated group as defined above or (b) phenyl or (c) $R^4$substituted phenyl where $R^4$ is a saturated or ethylenically unsaturated group as defined above which may be the same or different from $R^1$; a is an integer of 0, 1, 2, 3 or 4 and $R^2$ is H or a saturated or ethylenically unsaturated group as defined above, with the provision that the total number of carbon atoms in the saturated and ethylenically unsaturated aliphatic groups in $R^1$ and $R^2$ is from 3–25.

10. A process as defined in claim 6 wherein the extractant comprises an oxime selected from the group consisting of 5-heptyl salicylaldoxime, 5-octyl salicylaldoxime, 5-nonyl salicylaldoxime, 5-dodecyl salicylaldoxime, 5-nonyl-2-hydroxyacetophenone oxime, 2-hydroxy-5-nonyl benzophenone oxime, 2-hydroxy-5-dodecyl benzophenone oxime, and mixtures thereof.

11. A process as defined in claim 6 wherein the aliphatic or aromatic hydrocarbon is a kerosene.

12. A process as defined in claim 11 wherein the kerosene has a Flash Point of at least 150° F.

13. In a process of liquid-liquid extraction of metals wherein an aqueous solution (a) containing metal values is (i) contact ed with a water immiscible aliphatic or aromatic hydrocarbon solvent solution containing a water-insoluble extractant for the metal in the aqueous solution (a) for a time sufficient to extract metal values from the aqueous solution, thereby forming an aqueous phase from which metal values have been extracted and a water immiscible organic phase now loaded with the extracted metal values;

(ii) separating the two phases;

(iii) contacting the organic phase now loaded with metal values with (b) an aqueous stripping solution to strip and remove the extracted metal values from the organic phase;

(iv) separating the aqueous stripping solution now containing the metal values from the organic phase from which the metal values have been stripped and the organic phase is recycled back to the extraction step (i) and (v) recovering the metal from the aqueous stripping solution;

wherein at least one of the aqueous solutions (a) or (b) is an aqueous ammoniacal solution and wherein ammonia is transferred from the aqueous solution to the organic phase, the improvement comprising sparging the organic phase with an inert gas thereby removing the ammonia present in the organic phase and recovering the ammonia sparged from the organic phase, wherein the organic phase is sparged after the stripping step (iii).

14. A process as defined in claim 13, wherein the organic phase is sparged prior to recycling of the organic phase to the extraction step (i).

15. A process as defined in claim 14, in which the inert gas is air.

16. A process as defined in claim 15, and further comprising washing the organic phase prior to the stripping step (iii).

17. A process as defined in claim 15, wherein both aqueous solution (a) and aqueous solution (b) are ammoniacal solutions.

18. A process as defined in claim 15, wherein only one of the aqueous solutions is an ammoniacal solution.

19. A process as defined in claim 15 wherein the metal is selected from the group consisting of copper, zinc, cobalt, nickel and molybdenum.

20. A process as defined in claim 19, wherein the water-insoluble extractant is one capable of extracting the metal from an aqueous solution containing the metal value and is selected from the group consisting of:

(a) a diketone;

(b) an aryl hydroxy oxime; and (c) an amine.

21. A process as defined in claim 20 wherein the extractant comprises an hydroxy aryl oxime having the formula

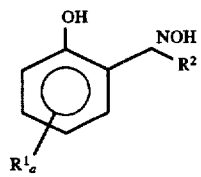

where $R^1$ is a saturated aliphatic group of 1–25 carbon atoms or an ethylenically unsaturated aliphatic group of 3–25 carbon atoms or $OR^3$, where $R^3$ is (a) a saturated or ethylenically unsaturated group as defined above or (b) phenyl or (c) $R^4$ substituted phenyl where $R^4$ is a saturated or ethylenically unsaturated group as defined above which may be the same or different from $R^1$; a is an integer of 0, 1, 2, 3 or 4 and $R^2$ is H or a saturated or ethylenically unsaturated group as defined above, with the provision that the total number of carbon atoms in the saturated and ethylenically unsaturated aliphatic groups in $R^1$ and $R^2$ is from 3–25.

22. A process as defined in claim 21, wherein the extractant comprises an hydroxy aryl oxime selected from the group consisting of 5-heptyl salicylaldoxime, 5-octyl salicylaldoxime, 5-nonyl salicylaldoxime, 5-dodecyl salicylaldoxime, 5-nonyl-2-hydroxyacetophenone oxime, 2-hydroxy-5-nonyl benzophenone oxime, 2-hydroxy-5-dodecyl benzophenone oxime, and mixtures thereof.

23. A process as defined in claim 19 wherein the extractant comprises a diketone having the formula

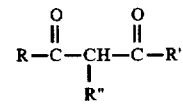

where R is phenyl or alkyl substituted phenyl,R' is alkyl, alkyl substituted phenyl or chloro substituted phenyl and R" is H or CN with the provisos that (1) when R is phenyl, R" is a branched chain alkyl group of at least seven up to 20 carbon atoms;

(2) when R is alkyl substituted phenyl the number of carbon atoms in the alkyl substituent is at least 7 up to 20 carbon atoms; and (3) when R' is alkyl the carbon alpha to the carbonyl group is not tertiary.

24. A process as defined in claim 23, wherein the diketone is phenyl-3-heptyl-1, 3-propanedione.

25. A process as defined in claim 19 wherein the extractant comprises an amine extractant selected from the group consisting of secondary, tertiary and quarternized amines having a total number of carbon atoms sufficient to be capable of solution in the hydrocarbon solvent and insoluble in water.

26. A process as defined in claim 25, wherein the extractant is an amine extractant selected from the group consisting of:

(a) a secondary amine selected from the group consisting of didodecylamine, and a dialkyl amine in which the alkyl groups are alkyl groups having 8–10 carbon atoms;

(b) a tertiary amine selected from the group consisting of tri-octyl amine, tri- dodecyl amine and a tri alkyl amine in which the groups are alkyl groups having 8 and 10 carbon atoms; and (c) the quaternized tertiary amines defined in (b) above.

27. A process as defined in claim 25 in which the extractant comprises a quaternized tertiary amine the cation of which has the formula

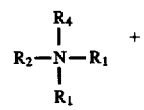

where one of the R groups is H or alkyl and the other R groups are alkyl groups having from 3–25 carbon atoms and the total number of carbon atoms is from about 22 up to about 35 carbon atoms.

28. A process as defined in claim 15, wherein the aromatic or aliphatic solvent is a kerosene.

29. A process as defined in claim 28, wherein the solvent has a Flash Point of at least 150° F.

* * * * *